Aug. 2, 1966 P. E. LA TENDRESSE 3,263,834
POLE CARRIER
Filed Oct. 14, 1963 5 Sheets-Sheet 1

INVENTOR.
Philip E. La Tendresse
BY
Darbo, Robertson & Vandenburgh
Attys

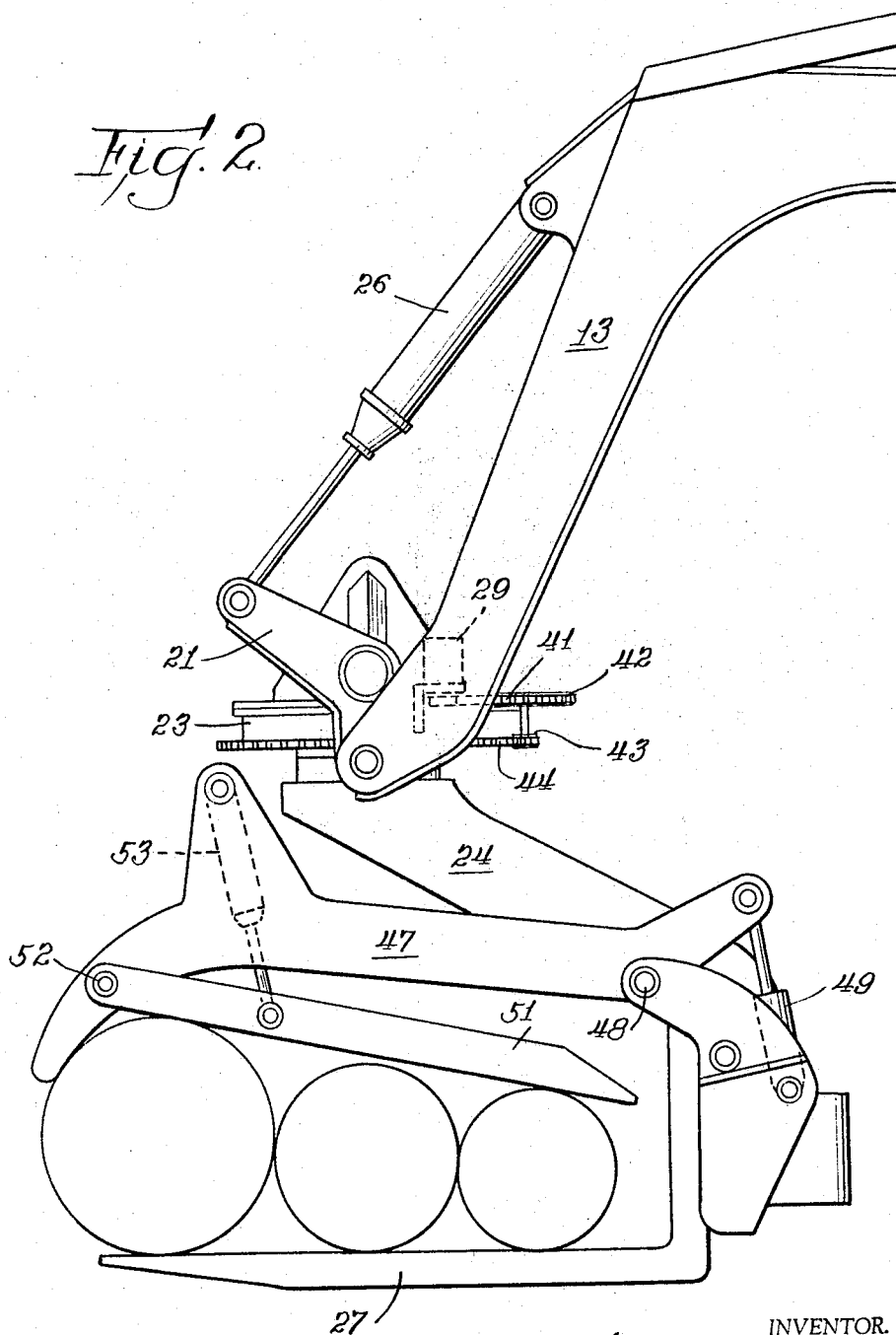

INVENTOR.
Philip E. La Tendresse

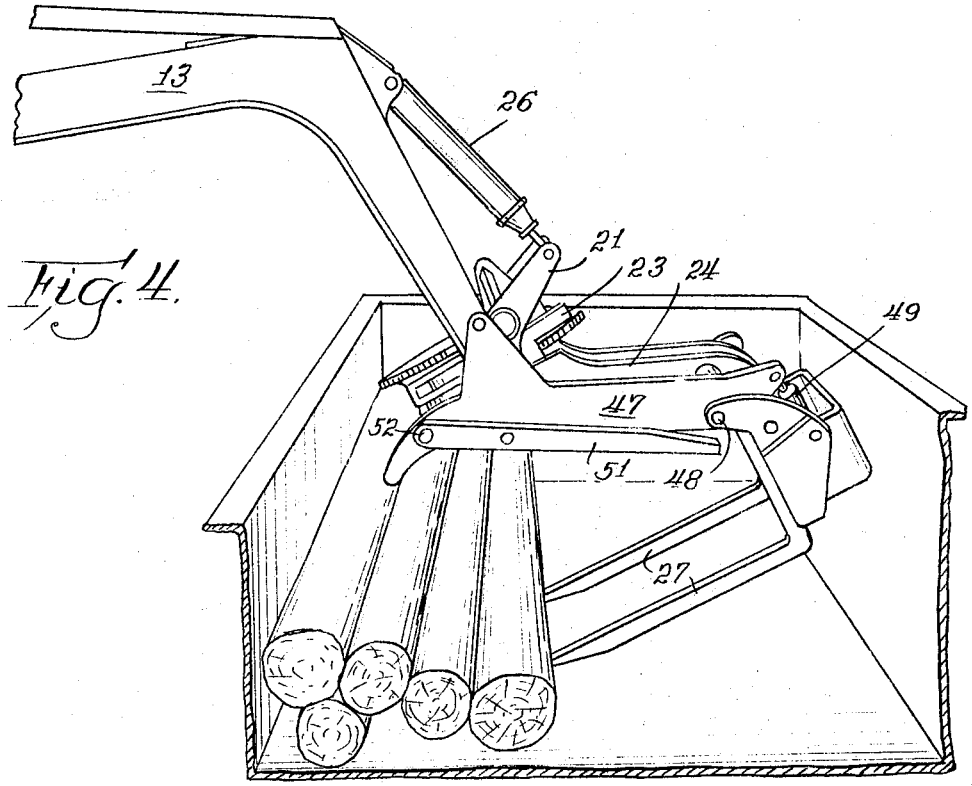
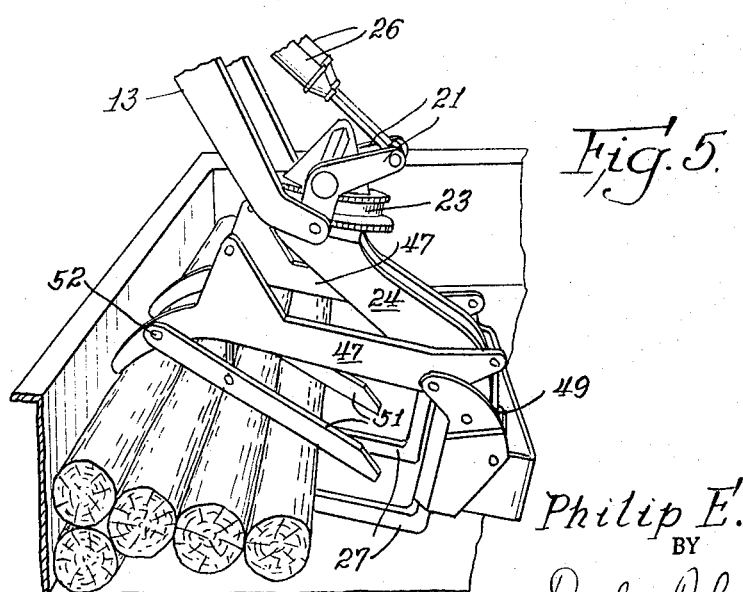

Aug. 2, 1966  P. E. LA TENDRESSE  3,263,834
POLE CARRIER

Filed Oct. 14, 1963  5 Sheets-Sheet 5

INVENTOR.
Philip E. La Tendresse
BY
Darbo, Robertson & Vandenburgh
Att'ys.

United States Patent Office 3,263,834
Patented August 2, 1966

3,263,834
POLE CARRIER
Philip E. La Tendresse, Baraga, Mich.
Filed Oct. 14, 1963, Ser. No. 315,798
10 Claims. (Cl. 214—77)

The handling of long poles such as utility poles, or the tree trunks from which they are made, has presented a long standing problem. This problem is largely solved by the pole-handling vehicle of the present invention, of which this disclosure is offered for public dissemination upon the grant of a patent.

The present invention may find its greatest utility in pole-yards. For example, a pole-finishing or treatment plant will naturally have a large supply of poles awaiting processing or shipment. These will naturally be piled in numerous piles dispersed around the yard. Most of them will necessarily be a substantial distance from the processing center. Previous pole handling vehicles have lifted the poles by forks and grippers engaging the pole near the center of its length and carrying it "crosswise" or in a position extending laterally to each side about half the length of the pole. This not only necessitates a wide clearance for the movement of the vehicle with its poles, but presented a severe problem of uneven weight distribution. Unless the operator succeeded in engaging the pole at its center of gravity, the pole would exert a tilting force on the vehicle and a twisting force on the boom and on any other connecting equipment. Severe unbalance could result in such lack of stability or such excessive strain that it would be necessary to put the load down, back away from it and move in to pick up the load again at a point closer to its center of gravity.

One pole-handling machine has reduced the side clearance problem by providing a swinging pole-gripper at the end of its boom. However, the swinging has been about an axis close to one side of the vehicle with the result that the entire vehicle has been off balance when the pole has been swung toward alignment with the length of the vehicle. This tended to aggravate some of the problems mentioned above.

According to the present invention, the pole-gripper is mounted at the end of the boom by means of a power-driven swivel having its axis on the longitudinally-extending center line of the machine, the load being carried generally centered on this axis so that in swinging the poles toward alignment with the longitudinal axis of the machine, a balanced load would not unbalance the machine and would not exert a twisting force on the machine. Of course, perfect balancing of the load is rare, and the machine preferably is provided with fixed horizontal arms on both sides of the frame on which the heavy end of the load could be rested during transit. Inasmuch as the boom has a reaching type of mounting, it could, when necessary, reach far enough forward so that the poles being carried could come reasonably close to a position of parallelism with the length of the machine, and hence not project too great a distance laterally. The long reach of the machine together with the unlimited swiveling movement of the pole-holder about its vertical axis can also be used for reversing a pole whenever the heavy end of the pole is in the wrong position for carrying or for other operation on the pole. The chosen pole-engaging device, although not new in itself, cooperates admirably with the other features by holding a plurality of poles with great firmness.

Additional objects and advantages of the invention will be apparent from the following description and from the drawings.

*Designation of figures*

FIGURE 1 is a perspective view of the form of the invention chosen for illustration, shown carrying four poles in the nearly aligned position.

FIGURE 1–A is a sectional view taken along the axis of the rest bars;

FIGURES 2 and 3 are side views showing the pole-gripping unit respectively in closed and open positions;

FIGURES 4 and 5 are views showing successive positions when the pole-gripper has been turned 180 degrees and is being used for picking poles out of the near side of a gondola car;

*General description*

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combination in which the inventive concepts are found.

Figure 1:
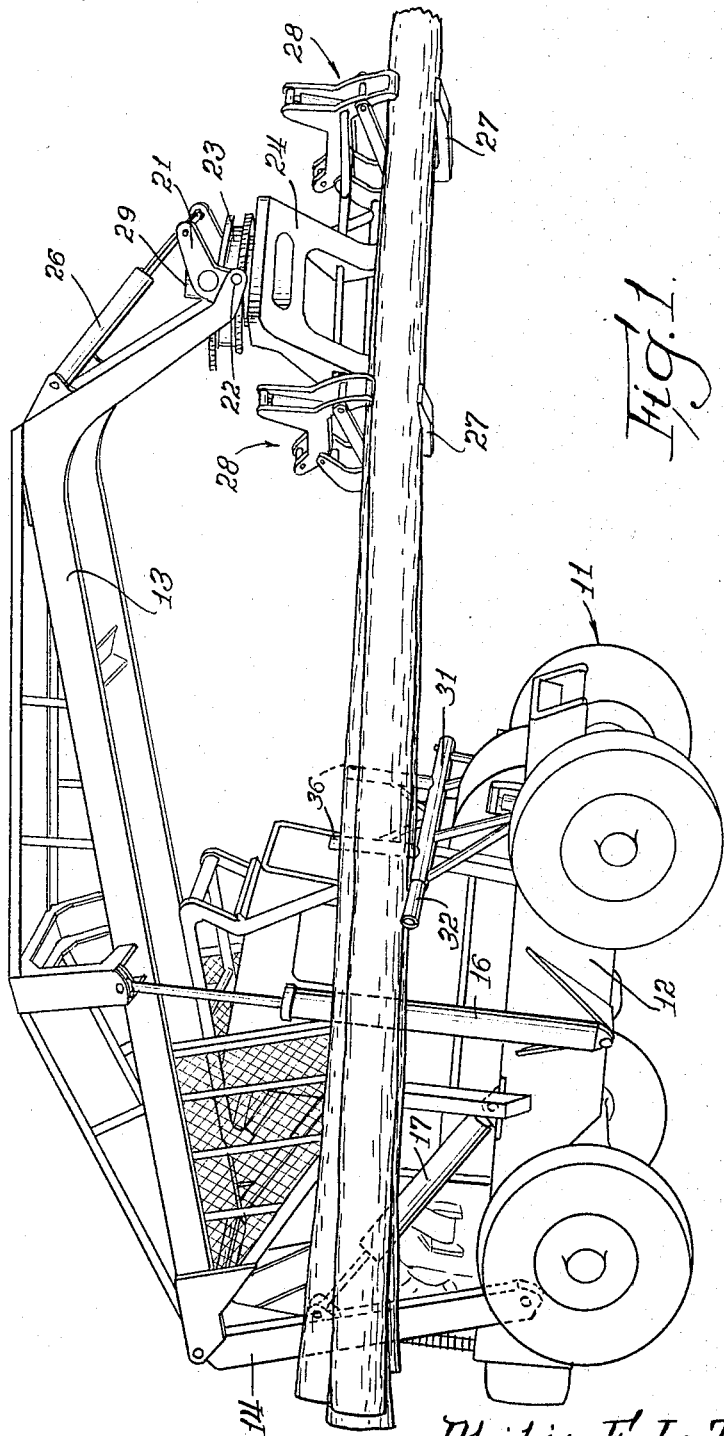
Figure 1A:
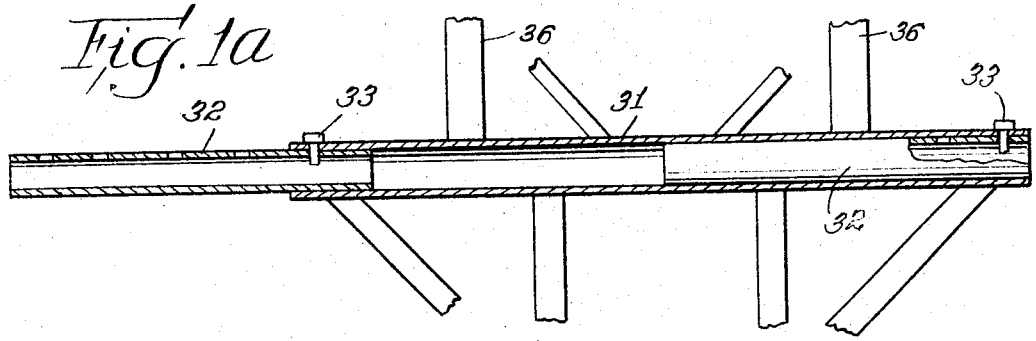
Figure 3:
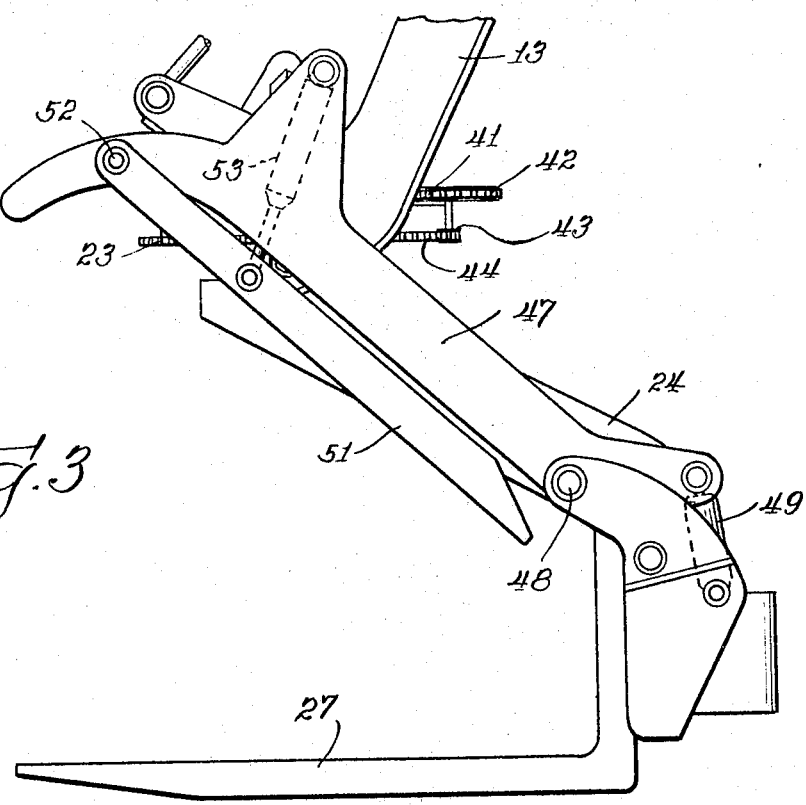

The load-handling apparatus of this invention includes a vehicle generally designated 11 which is preferably of the four-wheel type, and with uncertain terrain, all four wheels should be driven. Four wheels support a chassis 12 which also supports the hydraulically actuated handling apparatus. A lifting and reaching boom 13 is pivoted to the upper end of a reaching link 14, the lower end of which is pivoted to the chassis. The boom 13 can be raised and lowered by a pair of lift cylinders 16. Only one of the cylinders is shown in FIG. 1, but as is true of nearly all of the hydraulic units, they are provided in pairs, that on the far side not being shown. Likewise, the side members are duplicated on the opposite side, and the two secured with cross-pieces to form a rigid unit. The reaching link 14 is swung forwardly or rearwardly about its lower pivot by hydraulic cylinders 17. In this operation the reaching link 14 and lift cylinders 16 operate generally as a parallelogram to cause the forward end of the boom to reach or retract without much variation in the slope of the boom and relatively little in the vertical position of the pole-engaging unit. The action is especially good in this respect throughout the lower ranges of operation when the cylinder 16 and its retracted piston rod jointly have a total length roughly equal to the length of link 14. At the end of boom 13, a tilt frame 21 is pivoted about pins 22. The tilt frame 21 carries a turntable 23 to the rotating element of which a gripper body 24 is rigidly secured. The tilt frame 21 and parts carried by it may be tilted by tilt cylinders 26. The gripper body 24 carries a fork comprising tines 27 which are rigid with the body 24. A gripper assembly 28 is pivoted to the body 24, and is hydraulically actuated as will be described.

Although the gripper assembly 28 is not new in the present invention, the present invention contemplates carrying the whole pole-engaging unit on the turntable 23 which is driven by a hydraulic motor 29. Turntable 23 and motor 29 are adapted for unlimited rotation in either direction.

Also, according to the present invention, rest bars 31 are provided extending from opposite sides of the vehicle, and mounted firmly on the chassis 12. The permanent portions of the rest arms 31 extend no further outwardly than the other portions of the vehicle, particularly the tires. However, preferably, each arm is provided with an extension tube 32 therein, which can be withdrawn for an extension arm when required. As seen in FIG. 1–A, extension 32 can be locked in a variety of positions by a pin 33. In this manner, the poles are held very satisfactorily for transportation within a yard in which the poles may be stored or treated. Preferably the heavier ends rest on the arms 31. The poles are long enough so that they project somewhat beyond the vehicle to the rear of arm 31, but not nearly so far as if they were carried at right angles. Because the pole-engaging unit swivels about a vertical axis on the center line of the machine and also near the center of the pole-engaging unit, the machine is not thrown off balance as the poles are swung along one side. The balance is usually improved, because the heavy ends are swung inwardly. They are carried without any twisting strain on the lifting mechanism inasmuch as the heavy ends of the poles are supported by the fixed rest 31. The location of the swivel axis far in front of the machine (with the long boom in reach position) permits the poles to be swung to a surprisingly small angle (about 7°–20° depending on the load) with respect to the longitudinal axis of the vehicle. Upstanding stop arms 36 protect the vehicle cab and lift cylinders from the poles.

Wide variety of operations

A very wide variety of operations is made possible by the cooperation of the reaching and lifting booms, the unlimited rotational features, the tilt features, and the firm gripping of the poles by the pole-gripping features.

As shown in FIGS. 4 and 5, poles may be picked out of a gondola freight car, even on the near side thereof. To accomplish this, the pole-engaging unit is first swung through 180 degrees so that the forks point rearwardly and they are tipped with their points downwardly. If necessary, the arms are made to reach forwardly to lower the pole-engaging unit downwardly into the car with the fork's tips leading. When the tips are below the poles or at least below the centers thereof the pole-engaging unit can be drawn rearwardly either by retraction of the boom or by backing of the vehicle, simultaneously lowering the boom more if the forks are not already at the level of the car floor. When the fork is under the poles, the gripper can be actuated to grip the poles, the boom raised to lift the poles out of the car, and if any substantial length of transportation is required, the poles will be swung to rest on one of the arms 31.

Figure 6:
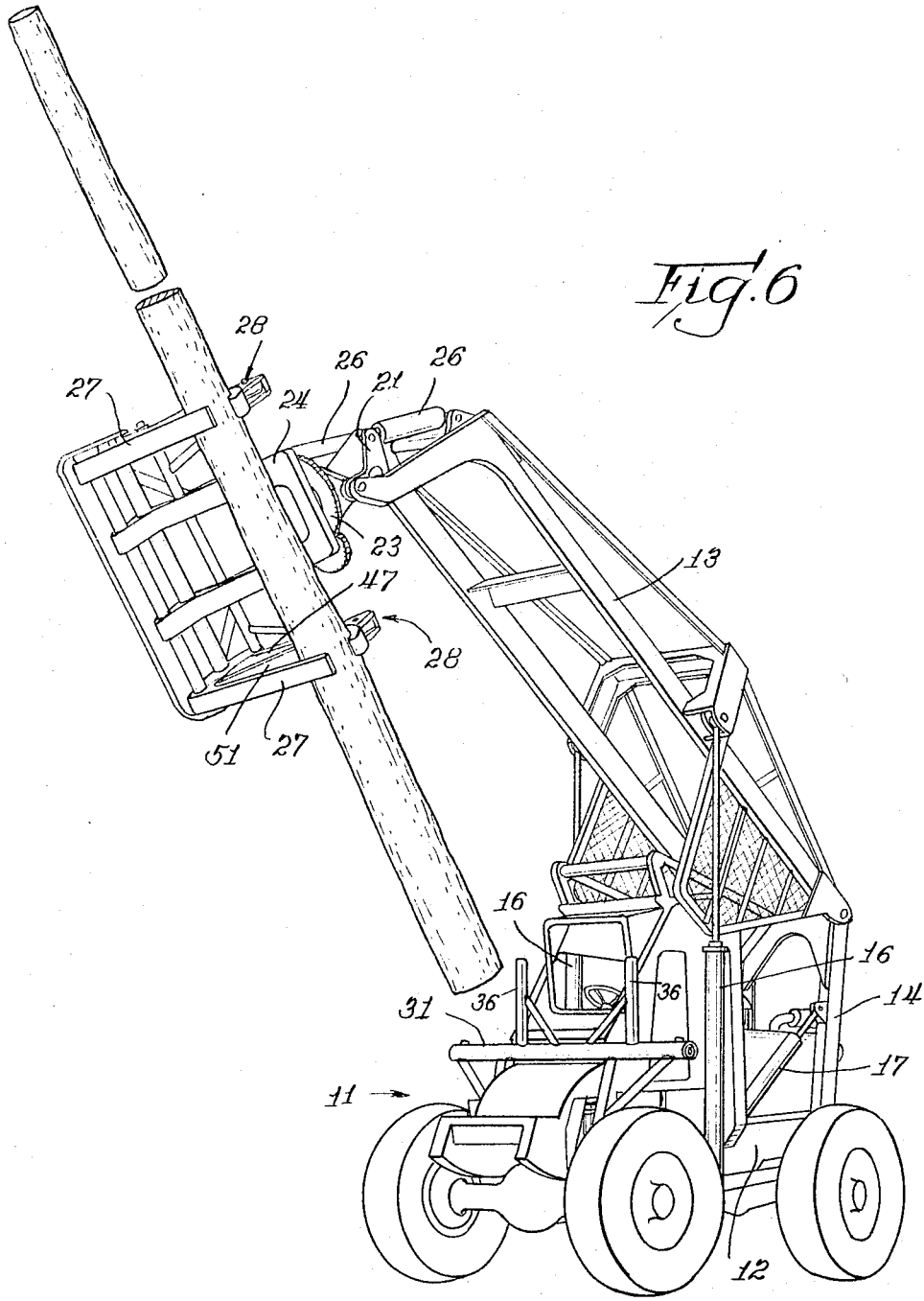
FIGURE 6 is a view showing a pole being swung end for end.

Another unusual operation is to swing the long poles end for end. This is sometimes very much of a timesaver. This can be done with the machine illustrated, as shown in FIG. 6, by extending the boom to its full reach, and possibly raising it to its full height. If the pole being turned is relatively long, it will have been gripped relatively close to its heavy end, even closer than the center of gravity. In this way, the heavy end can be made short enough, measured from the point of gripping, to be swung under the boom, past the machine.

Pole-engaging unit

As previously mentioned, the main body 24 of the pole-engaging unit is carried by the rotary element of turntable 23. As seen in FIG. 2, the hydraulic motor 29 drives a chain 41 which drives a sprocket 42, which in turn drives a smaller sprocket 43. This sprocket drives chain 44 which drives the rotary member of the turntable.

The fork 27 is rigidly carried by the main body 24 although the tines may be adjustable laterally if desired. The main gripper arms 47 (only one showing in FIG. 2) is pivoted to the body 24 by pins or shaft 48. It is actuated by a hydraulic cylinder 49. Auxiliary grippers 51 are pivoted at 52, each to a main gripper 47. Each of arms 51 is actuated by a hydraulic cylinder 53. The two cylinders 49 and the two cylinders 53 may all be actuated by the same hydraulic line, and are all double-acting cylinders, as are all the other cylinders. The relative diameters of cylinders 49 and 53 are such, compared to the relative weights which each operates that in opening the gripping unit, the auxiliary grippers 51 are raised first and then the grippers 47. This has an advantage in that if the tilt cylinder 26 is actuated to tilt the forks with their toes downwardly, auxiliary grippers 51 can be released and the poles can be allowed to roll off under control of the tip of the main gripper 47. The two grippers 47 are preferably structurally independent of one another, as are the two auxiliary grippers 51. If tines 27 are laterally adjustable, the gripper means may move with the tines, and each main gripper 47 may be pivoted to the shank of of a tine.

Hydraulic controls

It will, of course, be understood that the various hydraulic cylinders can be controlled from the position of the operator of the vehicle by separate valves for each of the functions except as noted. Thus, extreme versatility is achieved and poles of great length and weight can be carried without requiring extremely wide maneuvering space. Even while carrying several heavy poles largely along one side of the vehicle, the vehicle is quite stable in its movement.

What I here claim is:

1. Pole-handling apparatus including a mobile vehicle, a boom carried by the vehicle for lifting and reaching movements, separately controlled hydraulic means powering the reaching and lifting movements of the boom, a turntable tiltably carried by the boom, hydraulic means for operating the tilting of the turntable with respect to the boom, a pole-gripping unit carried by the movable element of the turntable and rotatable with respect to the boom, by power, unlimitedly in either direction, said pole-gripping unit including a pair of fork members for supporting poles, main gripper means secured pivotally at its rear to the gripping unit to clamp poles against the fork members, and auxiliary gripper means pivoted near the front of the main gripper means and extending rearwardly for gripping poles on said fork members near the rear thereof, hydraulic power means for actuating the main gripper means and hydraulic power means for actuating the auxiliary gripping means, said hydraulic power means for said gripper means being jointly controlled and having a diameter to weight relationship such that the auxiliary gripping means is raised first when hydraulic power for raising is applied to both; and rest arms extending laterally from the body of the mobile vehicle, lower than the top of the vehicle and higher than the tops of the tires, on which projecting portions of poles carried by said pole-gripping unit and turned to lie largely longitudinally of the vehicle may be rested for transportation, and guard members extending upwardly from the rest arms to limit movement of poles resting thereon in the direction of the body.

2. Pole-handling apparatus including a mobile vehicle, a boom carried by the vehicle for lifting and reaching movements, a pole-gripping unit carried by the boom and rotatable with respect to it on an axis constantly approximately centered as to the vehicle width, by power, unlimitedly in either direction; and rest arms extending laterally from an upwardly extending body of the mobile vehicle on which projecting portions of poles carried by said pole-gripping unit and turned to lie largely longitudinally of the vehicle and extending along and outside of the body may be rested for transportation.

3. Pole-handling apparatus including a mobile vehicle, a boom carried by the vehicle for lifting and reaching movements, a pole-gripping unit carried by the boom and rotatable with respect to it on an axis constantly approximately centered as to the vehicle width, by power in either direction; and rest arms extending laterally from an upwardly extending body of the mobile vehicle on which projecting portions of poles carried by said pole-gripping unit and turned to lie largely longitudinally of the vehicle and extending along and outside of the body may be rested for transportation.

4. Pole-handling apparatus including a mobile vehicle, a boom carried by the vehicle, a pole-gripping unit carried by the boom and rotatable with respect to it on an axis constantly approximately centered as to the vehicle width, by power in either direction; and rest arms extending laterally from an upwardly extending body of the mobile vehicle on which projecting portions of poles carried by said pole-gripping unit and turned to lie largely longitudinally of the vehicle and extending along and outside of the body may be rested for transportation; said swing axis being far enough ahead of the rest arm to allow a vertical axial plane intersecting the pole receiving space on the rest arm to lie within about 20 degrees of the longitudinal vertical plane midway of the width of the vehicle.

5. Pole-handling apparatus including a mobile vehicle having tires and a body extending substantially above the tires, a boom carried by the vehicle for lifting and reaching movements, a turntable carried by the boom and having a movable element, a pole-gripping unit carried by the movable element of the turntable and rotatable with respect to the boom, by power, unlimitedly in either direction; and rest arms extending laterally from an upwardly extending body of the mobile vehicle, lower than the top of the vehicle and higher than the tops of the tires, on which projecting portions of poles carried by said pole-gripping unit and turned to lie largely longitudinally of the vehicle and extending along and outside of the body may be rested for transportation.

6. Pole-handling apparatus including a mobile vehicle having tired wheels, and a cab extending substantially higher than the tires; a power-actuated boom articulated to the vehicle for movement confined to parallelism with a vertical longitudinal plane of the vehicle; a power-operated pole-gripping unit carried by the boom, and, in at least some boom positions, spaced beyond the wheels from the cab, and pivoted to the boom about vertical and horizontal axes, and powered, to swing poles gripped thereby to a position extending generally longitudinally of the vehicle but at an angle thereto, lying above the tires and close to and along the side of the cab; and sturdy rest means for supporting the poles in said position during travel while gripped by the pole-gripping unit, said rest means extending generally horizontally outwardly from adjacent the wall of the cab nearest to the pole-gripping unit.

7. Pole-handling apparatus including a mobile vehicle having tired wheels, and a cab extending substantially higher than the tires; a power-actuated boom articulated to the vehicle by a linkage providing vertical and longitudinal movement of the boom and confining it to those movements; a power-operated gripping unit carried by the boom, and, at least when the boom is moved in one longitudinal direction, substantially spaced from the cab, and pivoted to the boom about vertical and horizontal axes, and powered, to swing poles gripped thereby to a position extending generally longitudinally of the vehicle but at an angle thereto, lying above the tires and close to and along the side of the cab; and sturdy rest means for supporting the poles in said position during travel while gripped by the pole-gripping unit, said rest means extending generally horizontally outwardly from adjacent the wall of the cab nearest to the pole-gripping unit, and guard means upstanding from the rest means to limit movement of the poles toward the cab.

8. Pole-handling apparatus including a mobile vehicle having tired wheels, and a cab extending substantially higher than the tires; a power-actuated boom articulated to the vehicle by a linkage providing vertical and longitudinal movement of the boom and confining it to those movements; a power-operated gripping unit carried by the boom, and, at least when the boom is moved in one longitudinal direction, substantially spaced from the cab, and pivoted to the boom about vertical and horizontal axes, and powered, to swing poles gripped thereby to a position extending generally longitudinally of the vehicle but at an angle thereto, lying above the tires, lying close to and along the side of the cab; and sturdy rest means for supporting the poles in said position during travel while gripped by the pole-gripping unit, said rest means extending generally horizontally outwardly from adjacent the wall of the cab nearest to the pole-gripping unit.

9. Pole-handling apparatus including a mobile vehicle having tired wheels, and a cab extending substantially higher than the tires; a power-actuated boom articulated to the vehicle for movement confined to parallelism with a vertical longitudinal plane of the vehicle; a power-operated gripping unit carried by the boom, and, at least at some boom positions, substantially spaced beyond the wheels from the cab, and pivoted to the boom about vertical and horizontal axes, and powered, to swing poles gripped thereby to a position extending generally longitudinally of the vehicle but at an angle thereto, lying above the tires and close to and extending along the side of the cab; and sturdy rest means for supporting the poles in said position during travel while gripped by the pole-gripping unit, said rest means extending and being adjustable generally horizontally from the vehicle outwardly from adjacent the wall of the cab nearest to the pole-gripping unit, and guard means upstanding from the rest means to limit movement of the poles toward the cab.

10. Pole-handling apparatus including a mobile vehicle having tired wheels, and a cab extending substantially higher than the tires; a power-actuated boom articulated to the vehicle by a linkage providing vertical and longitudinal movement of the boom and confining it to those movements; a power-operated gripping unit carried by the boom, and, at least when the boom is moved in one longitudinal direction, substantially spaced from the cab, and pivoted to the boom about vertical and horizontal axes, the vertical axis being approximately in the vertical longitudinal plane centered between the wheels, power means to swing poles gripped thereby optionally to either of two positions along opposite sides of the cab and extending generally longitudinally of the vehicle but at an angle thereto, lying above the tires, and close to the cab; and sturdy rest means at each position for supporting the poles during travel while gripped by the pole-gripping unit, each rest means extending horizontally from the vehicle outwardly from adjacent the wall of the cab nearest to the pole-gripping unit, and guard means upstanding from the rest means to limit movement of the poles toward the cab.

References Cited by the Examiner

UNITED STATES PATENTS

| | | | |
|---|---|---|---|
| 2,181,253 | 11/1939 | Willis | 212—8 |
| 2,267,509 | 12/1941 | Strong | 296—24 |
| 2,522,466 | 9/1950 | Schneider. | |
| 2,701,649 | 2/1955 | Hallstrom | 214—3 |
| 2,704,162 | 3/1955 | Johnson. | |
| 2,821,311 | 1/1958 | Screws. | |
| 2,831,589 | 4/1958 | Way. | |
| 2,880,827 | 4/1959 | Gilmore | 214—3 X |
| 3,075,604 | 1/1963 | Barenyi | 180—89 |
| 3,112,830 | 12/1963 | Podlesak. | |
| 3,119,637 | 1/1964 | Eaves | 214—654 |
| 3,165,215 | 1/1965 | Larson. | |
| 3,182,833 | 5/1965 | Lull. | |

FOREIGN PATENTS

| | | |
|---|---|---|
| 659,445 | 3/1963 | Canada. |

GERALD M. FORLENZA, *Primary Examiner.*

MORRIS TEMIN, HUGO O. SCHULZ, *Examiners.*